INVENTORS.
OSKAR HABEGGER &
ALBERT STREBEL
BY Kurt Kelman
AGENT

INVENTORS.
OSKAR HABEGGER &
ALBERT STREBEL

BY Kurt Kelman

AGENT

United States Patent Office 3,510,233
Patented May 5, 1970

3,510,233
CYLINDER STRUCTURE FOR SINGLE OR MULTI-STAGE PISTON COMPRESSORS
Albert Strebel, Binningen, and Oskar Habegger, Therwil, Switzerland, assignors to Maschinenfabrik Burckhardt AG, Basel, Switzerland
Filed June 3, 1968, Ser. No. 733,950
Claims priority, application Switzerland, June 7, 1967, 8,060/67
Int. Cl. F04b 39/12
U.S. Cl. 417—454                     13 Claims

ABSTRACT OF THE DISCLOSURE

A cylinder housing contains inner components defining a bore for a piston and passages communicating with suction and delivery connections. The housing has an elastically extensible lower portion and a bottom closure with which the inner components are in abutment. A hydraulic pressure device reacts between an upper closure in the housing and the inner components to urge the latter against the bottom closure, so that the components may be mounted and dismounted in the housing without removal of the suction and delivery connections.

---

The present invention relates to a cylinder structure for single or multistage piston compressors (which term includes pumps), especially those operating at very high pressures, e.g. several thousand atmospheres.

For compressors operating at very high pressures, preferably cylinders of composite construction are used. The actual cylinder bore within which the piston stroke takes place is usually in a barrel with an inserted liner or containing rings forming annular chambers to receive packing elements if a plunger form piston is used. In order to carry away the heat produced in the cylinder, the barrel or chambers are often provided with grooves or flutes for the reception of cooling fluid. For centering the cylinder barrel is set in an outer tube secured to a thick base plate, which tube can also serve as a cooling jacket. By means of long anchor screw members secured in the base plate, the cylinder barrel or the stack of chamber-forming rings, set centrally in the outer tube, and the cylinder head for receiving the suction and delivery valves, which valves can be concentrically arranged as a unit, are combined into a cylinder structure. To impose the pre-loading necessary for fluid tightness, the anchor screw members are pre-tensioned by the aid of high pressure oil pumps through suitable devices of known kind.

The securing of the cylinder structure to the driving gear framework is usually effected by the cylinder base plate constructed with a connecting flange or by the cylinder head constructed with a connecting flange, the assembled cylinder structure then being centrally guide fitted into a guide frame which is either separately flanged on to or cast integrally with the driving gear framework.

The suction and delivery valves preferably of the same dimensions are mounted on the end surface or on both sides of the cylinder head and have lens forming sealing surfaces which are pressed against the cylinder inner core member by connecting members provided with flanges. The suction and delivery pipes are connected to the flanges of the connecting members.

In the operation of compressors having the cylinder structure built up as above described, in dismounting e.g. for exchange of the valves, removal of the cylinder barrel, sealing elements and so forth a considerable time is taken in removing the cylinder head and pipe connections, which in most cases is a serious interruption in the operation of a chemical process and also involves considerable cost for the loss of production involved.

A purpose of the present invention is to provide a cylinder structure for high pressure compressors which has the advantage over the known constructions of the possibility of rapid mounting and dismounting of the cylinder inner parts such as cylinder barrel, valves, packing elements and so forth and reduces the time necessary for the purpose to an acceptable value.

The structure has a cylinder housing to receive and centre the cylinder inner parts and at least one piston guided in the latter for compressing the medium, and has the necessary passages for suction and delivery conduit connections. In this structure, according to the invention, the cylinder housing together with a bottom closure having an internal bearing surface, with a portion capable of appreciable longitudinal elastic extension and with a head portion constitutes a unit, and the cylinder inner parts disposed within a bore in the cylinder housing and consisting at least of parts defining the actual cylinder bore in which the piston reciprocates and providing for communication of the space above the piston with suction and delivery valves, are clamped between said internal bearing surface and an upper closure member screwed into the upper end of the bore in said housing, so enabling said cylinder parts to be mounted or dismounted without removal of said suction and delivery conduit connections.

Further developments of the invention will appear from the following description in which reference is made to the accompanying drawing in which examples embodying the invention are illustrated.

The term "upper," "top," "bottom" and the like are used herein solely for convenience, assuming the cylinder is used with its axis vertical and the piston below the valves but the invention is not limited to this attitude.

Figure 1:
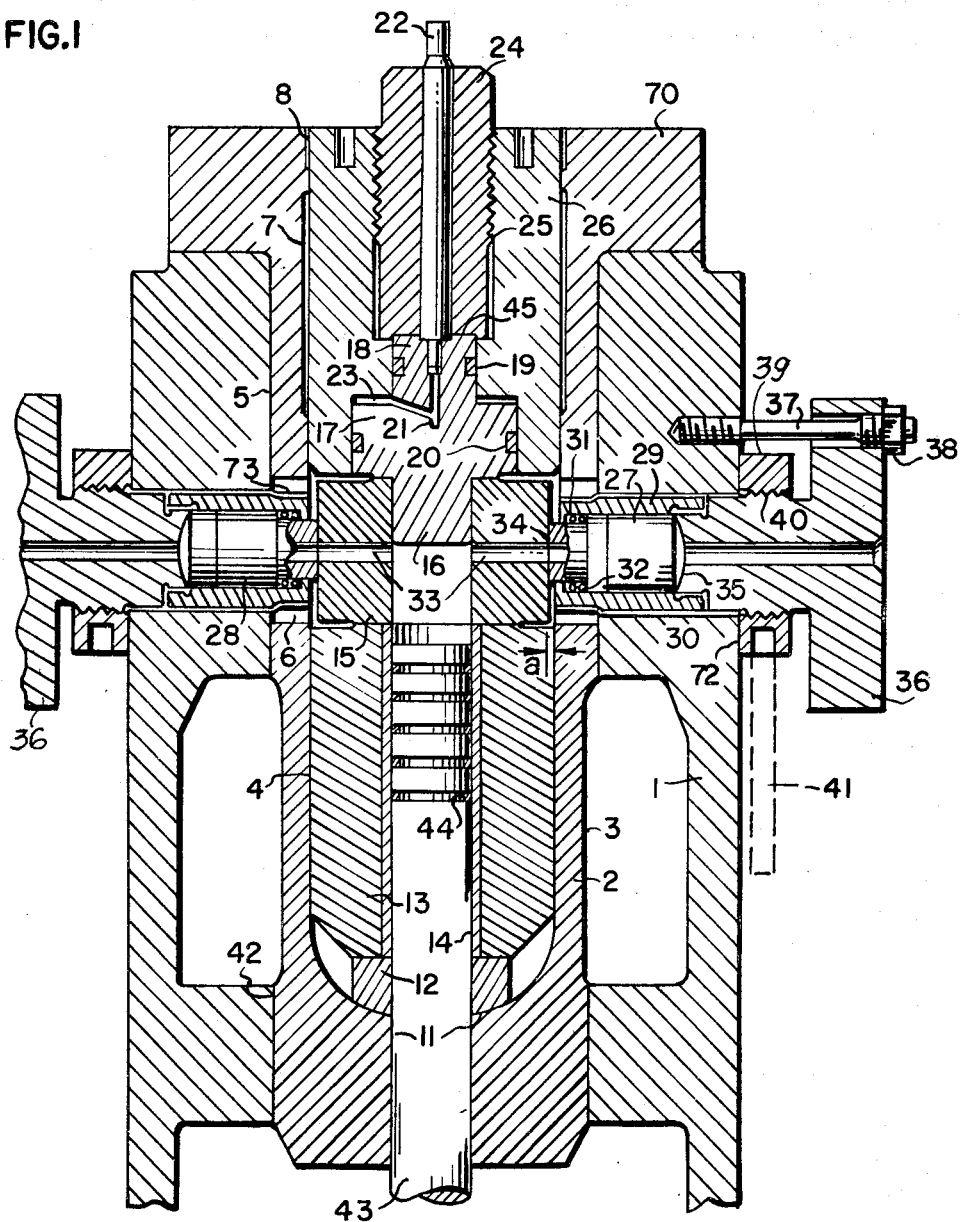
FIG. 1 is a vertical sectional view showing one embodiment of the invention.

In the example shown in FIG. 1, a cylinder guiding frame is marked 1, into which a one piece cylinder housing is a guided fit. To enable the cylinder receiving housing easily to be pressed in, the external diameter of the parts which seat in the frame are stepped, i.e. the external diameter of the guide collar 42 on the lower part of the housing 2 is smaller than the guide diameter 5 of the upper part forming the head portion. If the cylinder construction permits however, the lower end portion of the housing 2 can project without a guide surface at 42 freely into the frame 1. To permit unhindered expansion of the housing 2 in the direction of the cylinder axis in particular under the effect of the heat developed in operation, securing of the housing is effected by bolting a flange 70 at the upper end of the housing to the upper end of the frame 1. This flange can as FIG. 1 shows be unitary with the housing 2, but it is also possible to shrink it on or make it as a loose flange.

Figure 6:
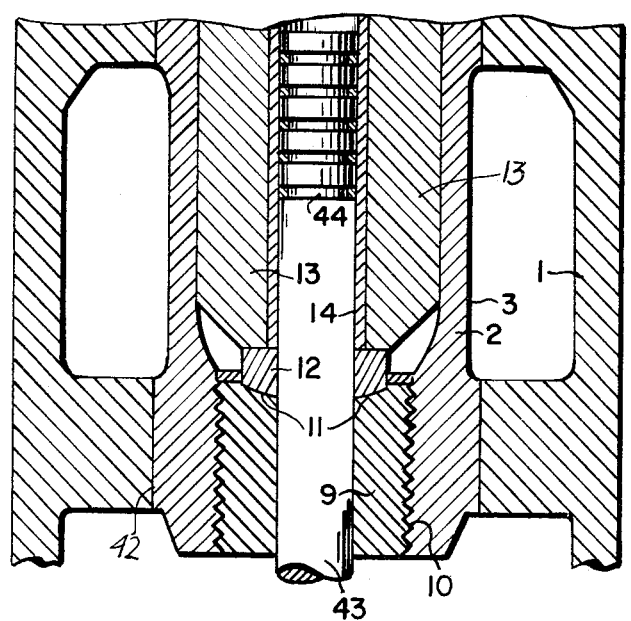
FIG. 6 is a fragmentary vertical sectional view of another modified embodiment.

The bottom closure of the housing 2 can be made in one piece with the rest of the housing, the inner end surface for abutment of the internal cylinder parts being of suitable form for good transmission of forces, e.g. with a part spherical hollowing 11. In cases where however the dimensions of the housing 2 cause difficulties in machining the inner end surface of an integral closure or makes machining impossible, a separate closure member 9 threaded at 10 can be screwed in, as shown in FIG. 6. The separate closure 9 is also provided with a hollowing 11 for good transmission of forces.

The cylinder housing 2 between the lower guiding collar 42 and the upper guiding part 5 incorporates a wall portion 3 extending over a predetermined length, the outer diameter of which is less than that of the collar 42 so as to give this portion a smaller cross section than the rest of the housing, the value being calculated to give the necessary longitudinal elastic extension under the preloading of the parts of the cylinder structure. On the inside of the bottom closure of the housing 2 is provided an intermediate member 12 which at the end towards the cylinder barrel 13 has a flat bearing surface and at the opposite end a curved surface matching the hollowing 11 in the lower closure of the housing 2.

The cylinder barrel with inset cylinder liner 14 presenting the bore for a reciprocating piston 43 having piston rings 44 as moving packing elements, is set in a central bore 4 in the housing 2. When it is set against the flat end surface of the intermediate member 12, the latter is centered by the action of its spherically curved bearing surface 11 so that the lower end surface of the cylinder barrel 13 bears all round against the flat end surface of the intermediate member 12.

Figure 2:
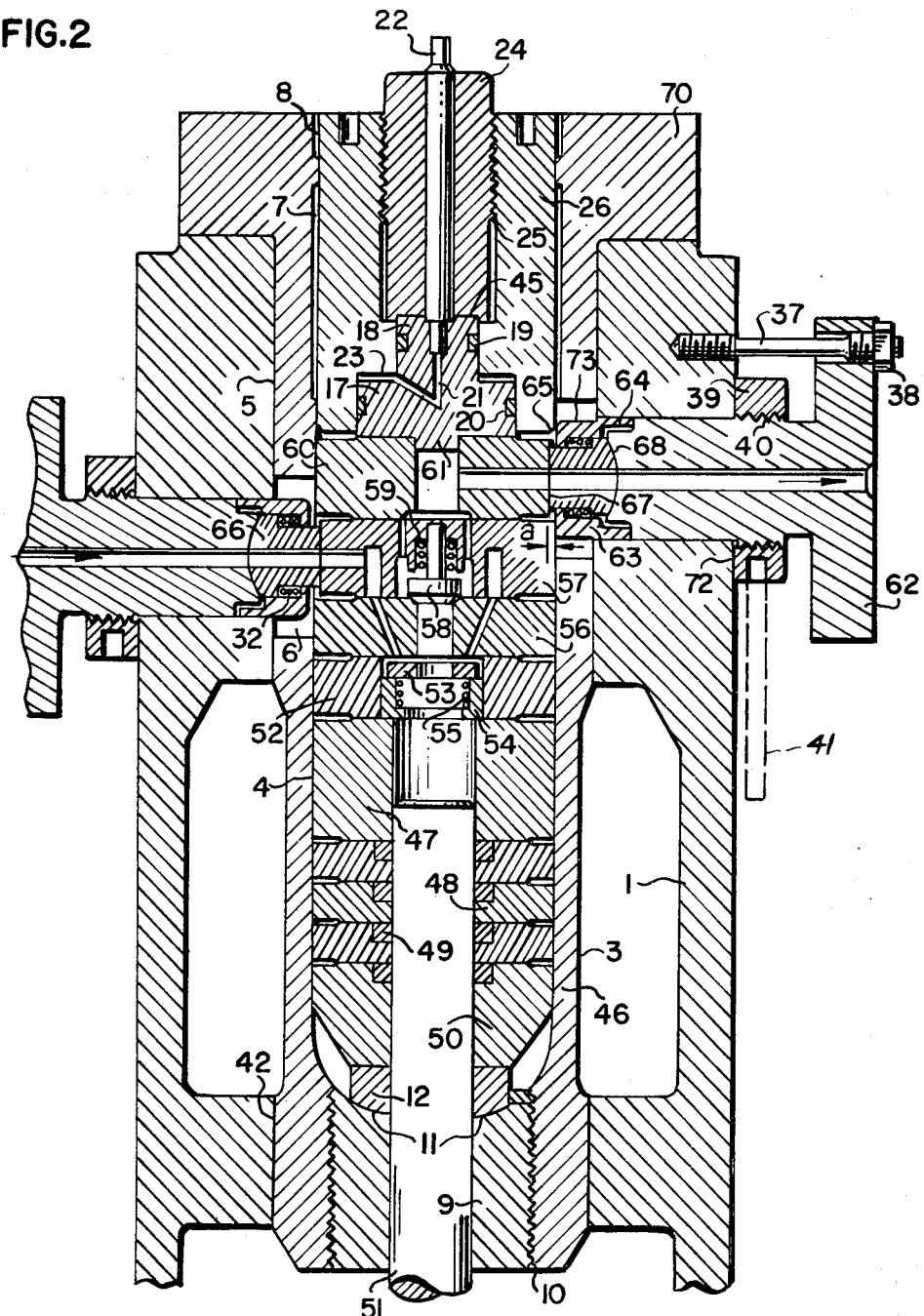
FIG. 2 is a vertical sectional view of a modified embodiment.

Instead of the cylinder parts 13, 14 of FIG. 1, an arrangement known per se comprising a stack of annular chamber-forming rings accommodating elements, for example comprising an upper ring 47, chamber forming rings 48, packing elements 49 and a lower ring 50, for coaction with a reciprocating plunger type piston 51, can be used as shown in FIG. 2, the cylinder housing here being marked 46.

Figure 3:
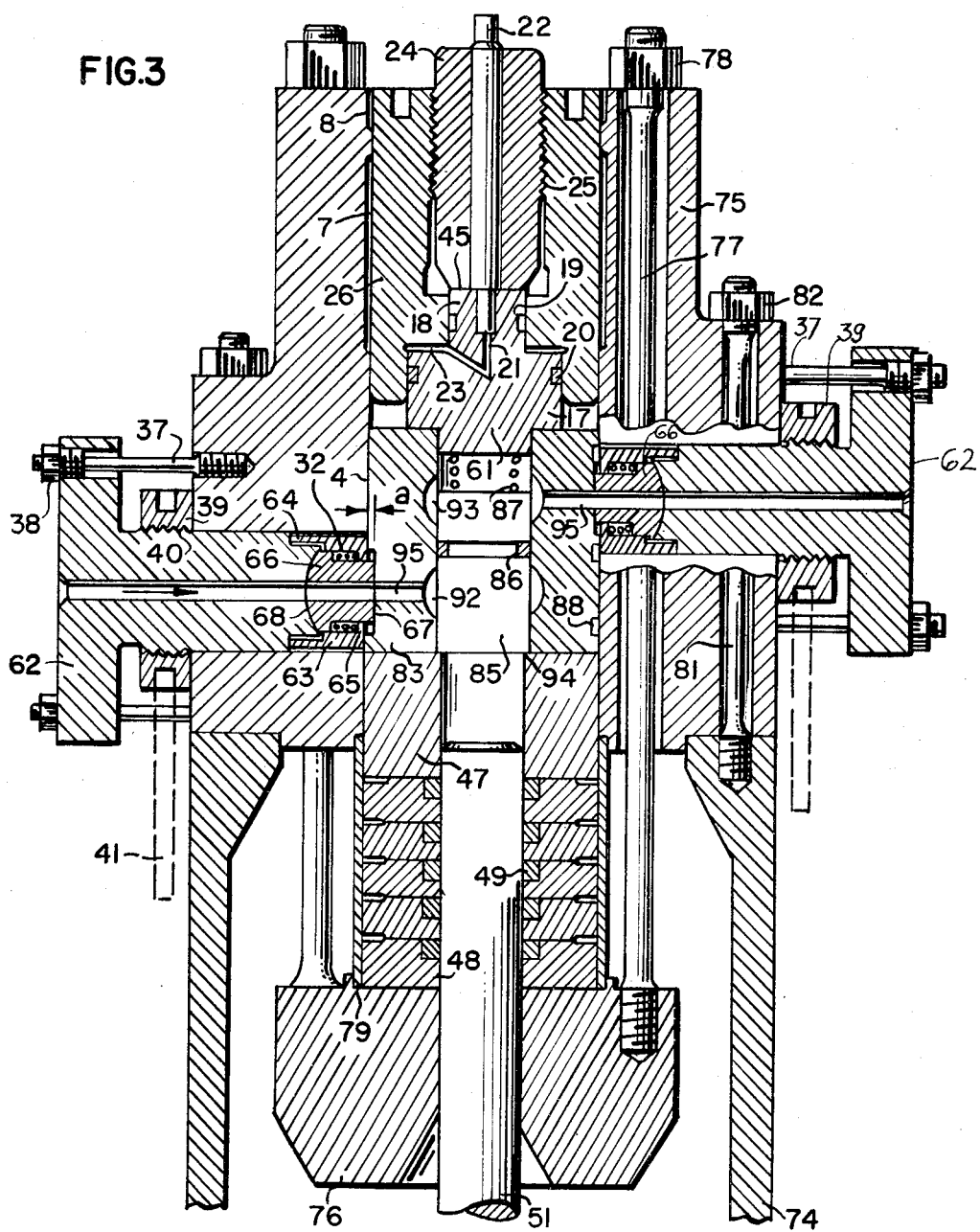
FIG. 3 is a vertical sectional view of another modified embodiment.

In place of the cylinder housing 2 of FIG. 1 or 46 of FIG. 2, which is a one piece member with the head portion and the bottom closure, a cylinder housing of composite structure can be used as shown in FIG. 3. Here a bottom end closure 76 of plate form together with a coaxial centering tube 79 having its end inserted in the plate and serving to receive the inner parts of the cylinder, for example the chamber forming rings 48 with packing element 49 for co-operation with a reciprocating plunger type piston 51 and a core member 83 with a central valve assembly 85, is secured by long anchor screw members here in the form of studs 77 and nuts 78 to the upper head 75. The studs have long waisted shafts and their number and the dimensions of their waisted shafts are calculated to provide the necessary longitudinal elastic extension in pre-loading the parts of the cylinder structure. The securing of the head member 75 on the upper end surface of the guide frame 74 is effected by studs 81 and nuts 82.

In FIG. 1 in a corresponding manner, the core member 15 having lateral passage 33 is so set on the upper end surface of the cylinder parts 13, 14 that the passages 33 register with lateral bores 6 in the housing 2 and guide frame 1.

The top closure for the core member 15 (in both FIGS. 1 and 3) is formed by a vertical inserted closure member 16 constructed as a hydraulic clamping piston of stepped form having a larger diameter piston portion 17 and a smaller diameter portion 18 which projects into a corresponding stepped bore serving as guide in the lower part of an upper closure member 26 of screw form. The chamber 23 left between the upper annular surface of the piston parts 17 and the surface facing it in the member 26 receives hydraulic pressure from an external source, and the stepped bore in the screw 26 is provided with packings 19 and 20 of known kind. Pressure of the clamping piston 16 in relation to the core member 15 is effected by the aid of a central screw thread 25 in the member 26, into which screws a pressure screw 24. Supply of hydraulic pressure to the chamber 23 can be effected, as shown by way of example in the drawing, by a pipe connection 22 coaxially disposed in a bore in the pressure screw 24 and screwing into the member 16 and a passage 21 communicating with the chamber 23. After mounting of the cylinder inner parts, the upper end of the cylinder housing 2 is closed by the closure screw 26 which owing to its particular construction described below can be pushed in axially in relation to the thread 7. So that the cylinder inner parts can be pushed into the bore 4 in the housing 2 without impediment, the core diameter of the closure screw thread 7 is made of larger diameter than the diameter of the bore 4.

Figure 4:
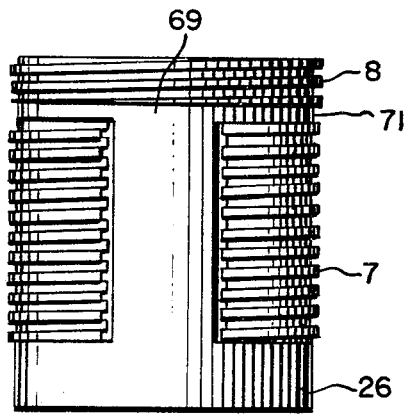
FIG. 4 is an elevational view of the upper closure member.
Figure 5:
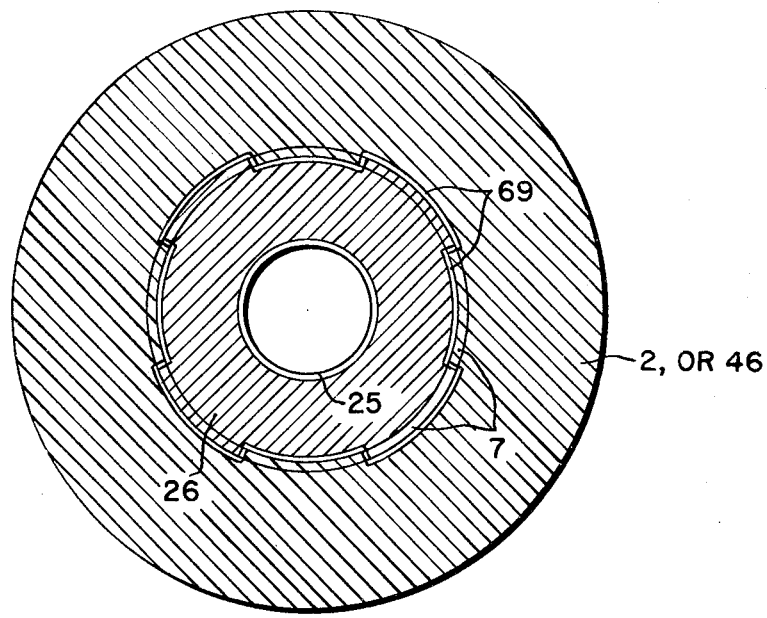
FIG. 5 is a cross-sectional view of the cylinder housing with the upper closure member therein.

To permit rapid removal of the closure screw 26 it has an interrupted screw thread on the lines shown in FIGS. 4 and 5. The thread machined with its parts as parts of a continuous thread is divided by a peripheral groove having a base diameter a little less than the core diameter of the thread, into two parts 7 and 8, the part 8 comprising a few turns of continuous thread over the whole periphery to ensure accurate meshing of the other part 7. The part 7 is divided by longitudinal grooves 69 the base of which is slightly below core diameter, into thread zones alternating with the grooves, the grooves and zones being uniformly distributed and with the grooves slighlty wider than the zones. The thread in the housing 2 or 46 is similarly interrupted by grooves over the whole length, with the grooves slightly wider than the threaded zones left. By aligning the threaded zones on the member 26 with the grooves in the housing, the member 26 can be entered directly axially until the part 8 reaches the mouth of the housing, whereupon the member can be screwed in, the continuously threaded part 8 ensuring that the threads in the interrupted zones will correctly mesh. Full mesh can be obtained in only a fraction of a turn and then after each further fraction represented by the annular width of one groove plus one zone. Full mesh may be indicated by registration of marks on the screw member 26 and the end face of the head portion of the housing.

In FIG. 1 the separate suction and delivery valves are respectively marked 27 and 28. These valves are mounted by connecting members 36 made externally as pipe couplings pressing flat surfaces 34 at the inner ends of the valve assemblies so firmly against corresponding sealing surfaces on the core member 15 that metal to metal sealed joints are made, the surfaces being suitably machined for the purpose. Pressing of the connecting members 36 is effected through flanges, which may be integral as shown in FIG. 1, which are held by studs 37 and 38 on the outside of the guide frame 1. To enable the members 36 to be withdrawn a screw nut 39, rotated by a lever 41 and screwing on a thread 40 on the member can engage an abutment surface 72 on the frame 1. So that the suction valve 27 or delivery valve 28 is positively retracted radially with the connecting member 36 when the latter is retracted, the valve is carried in an enclosing sleeve 29 which by a thread 30 is screwed on to the connecting member. So that when the connecting member has not been drawn up tight, e.g. during its withdrawal, the preferably lens-form sealing surface 35 of the valve 27 or 28 of FIG. 1 may remain pressed against the corresponding sealing surface of the connecting member 36, in the intermediate space between a bead 31 in the sleeve 29 and a corresponding reduced diameter portion of the valve, a spring 32 is inserted of such dimensions that in screwing up the sleeve 29 on the thread 30, the spring is positively stressed, so that the valve is constantly urged radially outwards.

Mounting of the cylinder parts in the example of FIG. 2 is effected similarly to that of the parts in FIG. 1. The only difference is that instead of the individually mounted valves 27 and 28 on the outside, assemblies of known kind with concentric motion and delivery valves are used which are among the cylinder inner parts, comprising for example the parts 52 to 60 of FIG. 2, the suction valve assembly comprising a body 52, the actual annular valve plate 53, seating ring 54 and spring 55, and the delivery valve assembly which is arranged above the suction valve assembly with the interposition of an intermediate body 56 comprising a body 57, the actual valve member 58, valve spring 59, and a further body 60. With this arrangement the connections for the supply and delivery conduits for the medium to be compressed are provided by the bodies 57 and 60 of the valve assembly and separate inserts 66, flat inner end surfaces 67 on these inserts being pressed through connecting members 62 made externally as pipe couplings, against corresponding sealing surfaces machined on the bodies 57 and 60, hard enough to ensure a metal to metal seal. As with the separate valves 27 and 28, here each insert 66 is retained by a separate sleeve 63 which is screwed on to a thread 64 on the member 62, the enclosed stressed spring 32 pressing the insert 66 at all times against the seating surface 68 which can for example be of lens shape, the sleeve 63 ensuring that upon retraction of the loosened member 62 the insert 66 is positively retracted with it.

The mounting of the cylinder inner parts in the arrangement shown in FIG. 3 is effectively similar to that of the inner parts of FIGS. 1 and 2. The only difference is that the central valve 85 of known kind contains the suction and delivery valves in a unit in contradistinction to the assemblies of FIG. 2, which unit is coaxially slidable in a cylindrical bore in a core member 83. Pressing of the central valve unit 85 against a seat 94 on the upper cylinder ring 47 can be effected by a spring member, for example a spring 87 which when the clamping piston 61 is inserted is given a predetermined load. An annular packing 86 of known kind is set between the annular space 93 which is the arrangement shown by way of example is under delivery pressure and the annular space 92 which is under suction pressure, to obtain tightness between the two spaces.

Clearly there would be no change in principle in mounting the parts if in place of the central valve unit 85 in FIG. 3, set in a core member 83, concentric suction and delivery valves as in FIG. 2 were used.

Connection to the conduits for the supply and delivery of medium to and from the core member 83 can be effected by means of connecting members 62 and intermediate members 66 held by sleeves 63, which intermediate members are pressed into sealing contact in a manner corresponding to that above described with reference to FIG. 2.

Figure 7:
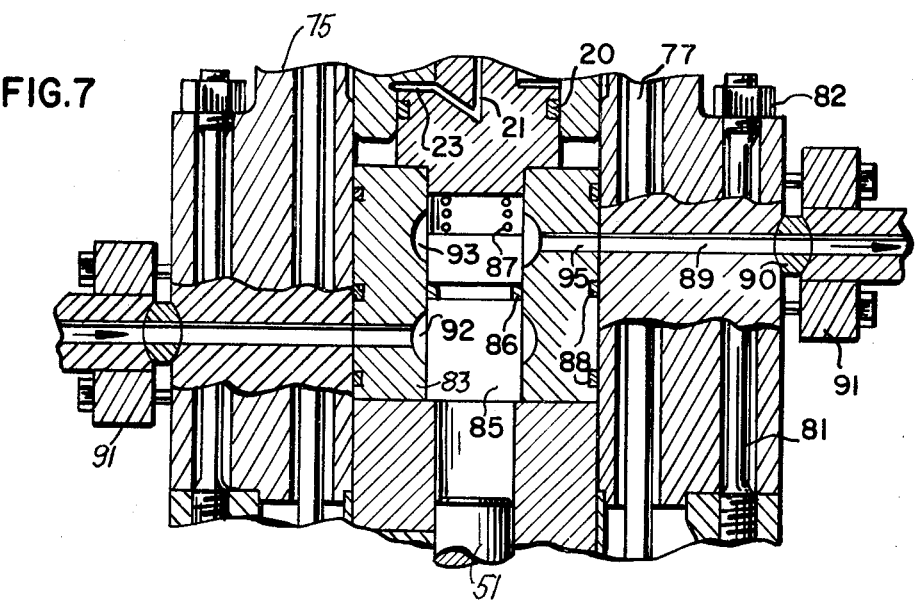
FIG. 7 is a fragmentary vertical sectional view of another modification.

However to achieve simpler mounting and dismounting of the cylinder inner parts the connections for the medium can be made laterally to the head portion 75 in the manner shown in FIG. 7.

In this arrangement the zones of the outer surface of the cylindrical core member 83 into which open radial passages 95 leading from the inner annular spaces 92 and 93 and which communicate with the lateral further passages 89 in the head portion 75 are so sealed from one another by inserted packings 88 of known kind engaging the bore of the housing and located between the passages 95 and above and below the latter that no leakage of medium can occur along the inner part of the core member wall between the zone under suction pressure and the zone under delivery pressure, nor any leakage along the outer parts of the core member wall to atmosphere from the zone under suction pressure or from the zone under delivery pressure.

The connections for the supply and delivery conduits for the medium can then be made at the lateral surface of the head portion 75, as shown in FIG. 7, in known manner by threaded flanges 91 with the interposition of lens form sealing elements 90.

Mounting and dismounting of the cylinder inner parts in all the embodiments is effected in a short time as follows:

For dismounting, the nuts 38 are loosened and unscrewed until the connecting member 36 of FIG. 1 or 62 of FIG. 2 to which the conduit for supply and delivery of the medium is coupled, can be moved back at least through the distance a (FIG. 1) By rotating the nuts 39 on the thread 40 using a lever 41, the members 36 or 62 are retracted until the projecting ends of the suction and delivery valves in FIG. 1 or of the inserts 66 of FIGS. 2 and 3, projecting into the bore 4 are withdrawn at least through the distance a thereby freeing the bore 4 in the housing 2 of FIG. 1 or 46 of FIG. 2 or in the head portion 75 of FIG. 3 for pushing out the cylinder inner parts.

Through the loaded springs 32, the valves 27 and 28 in FIG. 1 and the inserts 66 in FIGS. 2 and 3 remain pressed against the sealing surfaces 35 or 68 of the connecting valves 36 or 62. The pipe conduits extending from the flanges of the members 36 or 62 will in general (as by the inclusion of bowed sections) have so much flexibility that the forces necessary for withdrawal of the valves 36 or 62 through the required distance can be exerted without difficulty through the nuts 39 and lever 41.

Thereafter through the pipe connections 22 and passage 21 a hydraulic pressure is supplied to the chamber 23 of such value that under the force exerted the annular surface formed in the chamber between the steps 17 and 18, on the clamping piston 16 of FIG. 1 or 61 of FIGS. 2 and 3 and transmitted through the assembled cylinder inner parts, the cylindrical part 3 of the housing 2 of FIG. 1 or 46 of FIG. 2 or the shafts of the anchor studs 77 of FIG. 3 are downwardly elastically extended under tension. The clamping pressure acting through the bottom end surface 45 of the central screw 24 is thus relieved and the screw 24 can without difficulty be screwed back a few turns. After release of the hydraulic pressure in the chamber 23, the preloading of the screw threads 7 of the screw 26 is relieved and this after rotation sufficiently to disengage the completely threaded part 8, and bring the interrupted threads into alignment with the grooves which can be done rapidly and without difficulty, can be directly withdrawn axially from the housing 2 carrying the screw 24 still screwed into it, whereafter the inner parts can be removed upwardly.

For dismounting the valves 27 and 28 in FIG. 1, after removal of the screw member 26, the closure piston 16 and the cylinder core member 15, a special tool e.g. a hexagon socket spanner is passed through the cylinder bore 5 into the bore 6 of the housing 2 and over a corresponding hexagon formation 73 on the sleeve 29 projecting into the bore 6, and the sleeve is rotated to unscrew it from the thread 30 of the connecting member 36. After removal of the sleeves 29, the valves 27 and 28 can be removed through the bore 5 without difficulty.

To dismount the cylinder inner parts in the arrangements of FIGS. 2 and 3 the procedure is the same as described above with reference to FIG. 1. With central suction and delivery valves as in FIGS. 2 and 3 there is a simplification in that the central valves can be moved upwardly directly out of the housing 46 of FIG. 2 or head portion 75 of FIG. 3 with the other cylinder inner parts after the connecting members 62 with the intermediate members 66 have been retracted through the distance $a$.

A still further simplification in dismounting is obtained with the arrangement shown in FIG. 7 in that retraction of the connecting members through the distance $a$ is not needed.

Mounting of the cylinder parts in all embodiments is effected by proceeding in the reverse manner to that described for dismounting.

After screwing the sleeves 29, with the springs 32 and valves 27 and 28 in place, on to the thread 30 on the connecting members 36, care must be taken that the sealing surfaces 34 are so far retracted into the bores 6 that the valves do not project into the path of the parts 13 and 15 into the housing 2. This retraction is ensured by rotating the nuts 39 by the lever 41. Thereupon the cylinder inner parts are inserted in the order 12, 13 and 15, and the clamping piston 16 is then placed in position.

After this, the screw member 26 is directly axially inserted into the upper end of the cylinder receiving housing, with the grooves and interrupted threads correctly aligned until the uninterrupted threaded part 8 reaches the top of the housing. The member 26 is now screwed in until the pressure surfaces of the chamber 23 abut. After this abutment the screw member 26 is turned back until the mark on its upper end surface registers with the mark on the cylinder housing flange showing that the threaded portions of the interrupted threads on the screw member and in the housing are in full mesh and can be subjected to loading. During the insertion of the screw member 26 the stepped piston parts 17 and 18 of the closing piston 16 (or 61) are engaged with the packing rings 19 and 20 of known kind located in the bores on the lower end of the screw member.

The pressure screw 24 up to now has not yet come into contact with the upper end surface 45 of the piston part 18. By means of hydraulic pressure (admitted through 22, 21 to the chamber 23) of a value exactly corresponding to the necessary preloading of the cylindrical part 3 of FIGS. 1 and 2 or of the shafts of the anchor studs 77 of FIG. 3, the cylinder closure 9 of FIG. 1 or 46 of FIG. 2, or 76 of FIG. 3 is carried downwardly by elastic extension of the housing or of the studs, the clamping piston 16 of FIG. 1 or 61 of FIGS. 2 and 3 being carried downwardly by the same amount. After reaching this predetermined hydraulic pressure, the central screw 24 is screwed in until its lower end surface abuts the end surface 45 of the piston part 18, which can be effected without any heavy forces being exerted.

If the hydraulic clamping pressure in the chamber 23 is now released the preloading in the part 3 of the housing 2 or 46, or in the shafts of the anchor studs 77 is now transferred from the thread 25 of the pressure screw 24 and from the engaged zones of the thread 7 to the closure screw member 26. In this way the screwed parts 24 and 26 are put under preload and owing to the high forces necessary to overcome the friction between the loaded threads, they will not loosen during operation of the compressor.

After mounting of the cylinder parts in the manner above described the nut 39 on each connecting member 36 of FIG. 1 or 62 of FIG. 2 or 3 is screwed back until it is clear of the bearing surface 72. Thereafter the flange of the connecting member is drawn up by the aid of the nuts 38, whereby the member 36 or 62 is pushed in the direction towards the cylinder until good sealing pressure is reached at the sealing surfaces 34 and 35.

What we claim is:

1. In a cylinder structure for high pressure compressors and the like, the combination of a cylinder housing, inner cylinder component means disposed in said housing and defining a cylinder bore and suction and delivery passages communicating with said bore, suction and delivery connections communicating with said passages, a piston reciprocable in said bore, said housing including an elastically extensible lower portion and a bottom closure with which said inner component means are in abutment, an upper closure member removable screw-threaded in the upper portion of said housing, and a hydraulically actuated pressure device reacting between said upper closure member and said inner component means to urge the latter against said bottom closure, whereby the inner component means may be mounted and dismounted in said housing without removal of said suction and delivery connections.

2. The structure as defined in claim 1 together with a frame having said cylinder housing mounted therein, said frame including guide means slidably accommodating said elastically extensible lower portion of the housing.

3. The structure as defined in claim 1 wherein the upper end portion of said housing is provided with a screw thread interrupted by longitudinal grooves, said upper closure member having a short continuously screw-threaded upper end portion and a relatively long load bearing main portion provided with an interrupted screw thread cooperating with the screw thread of the housing so that the upper closure member may be freely slid into and out of the housing when the interrupted screw threads are disengaged, the continuously threaded upper portion of the closure member serving to facilitate engagement of the interrupted threads after the closure member has been slid into the housing.

4. The structure as defined in claim 1 together with a pressure screw disposed axially in said upper closure member, said hydraulically actuated pressure device including a clamping piston engaged by said pressure screw and engaging said inner component means so that when the pressure screw is tightened, pressure is transmitted through the inner component means to said bottom closure for preloading and elastically extending the lower portion of said housing.

5. The structure as defined in claim 4 wherein said clamping piston has a stepped configuration to form a chamber between itself and said upper closure member, and passage means for delivering hydraulic fluid under pressure from an external source to said chamber.

6. The structure as defined in claim 5 wherein said passage means include a pipe connection extending axially through said pressure screw.

7. The structure as defined in claim 1 wherein said bottom closure has a concave internal bearing surface with which said inner component means are in abutment.

8. The structure as defined in claim 1 together with suction and delivery valves provided in the respective suction and delivery passages exteriorly of said inner cylinder component means, one of said inner component means comprising a core member against which said valves are clamped by said suction and delivery connections.

9. The structure as defined in claim 8 together with sleeves provided on said suction and delivery connections, said valves being disposed in the respective sleeves and spring-pressed outwardly therein.

10. The structure as defined in claim 9 together with screw-threaded means provided on said suction and delivery connections for retracting said sleeves with said valves from said core member.

11. The structure as defined in claim 1 wherein said inner cylinder component means include suction and delivery valves communicating with the respective suction and delivery passages, together with sleeves provided on said suction and delivery connections, and inserts disposed in said sleeves in communication with said passages, said sleeves and inserts being disposed exteriorly of said inner component means with the inserts being spring-pressed outwardly in the sleeves but clamped inwardly against said valves by said suction and delivery connections.

12. The structure as defined in claim 11 together with screw-threaded means provided on said suction and delivery connections for retracting said sleeves with said inserts from said valves.

13. The structure as defined in claim 1 wherein said inner cylinder component means include a core member and suction and delivery valves disposed in said core member, said suction and delivery passages being provided in the core member and communicating said valves with said suction and delivery connections.

References Cited
UNITED STATES PATENTS

| | | |
|---|---|---|
| 2,044,064 | 6/1936 | Dake. |
| 2,732,809 | 1/1956 | Mattingly et al. 103—216 |
| 2,828,696 | 4/1958 | Wright 103—153 |
| 2,943,895 | 7/1960 | Miller 103—216 XR |

ROBERT M. WALKER, Primary Examiner

U.S. Cl. X.R.

92—171; 417—568